(12) United States Patent
Zhou et al.

(10) Patent No.: US 9,491,102 B1
(45) Date of Patent: Nov. 8, 2016

(54) TRAFFIC LOAD BALANCING IN A MULTI-CONNECT TOPOLOGY

(71) Applicant: Google Inc., Mountain View, CA (US)

(72) Inventors: Junlan Zhou, Mountain View, CA (US); Min Zhu, Mountain View, CA (US); Amin Vahdat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 14/176,518

(22) Filed: Feb. 10, 2014

(51) Int. Cl.
*H04L 12/26* (2006.01)
*H04L 12/803* (2013.01)
*H04L 12/66* (2006.01)
*H04L 12/46* (2006.01)
*H04L 12/715* (2013.01)

(52) U.S. Cl.
CPC ......... *H04L 47/125* (2013.01); *H04L 12/4633* (2013.01); *H04L 12/66* (2013.01); *H04L 43/0882* (2013.01); *H04L 45/64* (2013.01)

(58) Field of Classification Search
CPC . H04L 47/125; H04L 43/0882; H04L 12/66; H04L 45/64; H04L 12/4633
See application file for complete search history.

(56) References Cited

U.S. PATENT DOCUMENTS

| 9,077,608 | B2 | 7/2015 | Zhu et al. | |
|---|---|---|---|---|
| 2008/0049609 | A1* | 2/2008 | Chao et al. | 370/218 |
| 2012/0287791 | A1* | 11/2012 | Xi et al. | 370/237 |
| 2013/0148655 | A1 | 6/2013 | Malik et al. | |
| 2014/0078904 | A1 | 3/2014 | Yu | |
| 2015/0249600 | A1 | 9/2015 | Numata | |

\* cited by examiner

*Primary Examiner* — Kiet Tang
(74) *Attorney, Agent, or Firm* — McDermott Will & Emery LLP (57) ABSTRACT

A technique for load balancing in a multi-topology network selects a network path having a favorable bandwidth\*hop count product. Accordingly, shorter paths are prioritized while longer paths are used for traffic load balancing when appropriate. For example, a telecommunications network may employ a Clos-style topology in which hosts are connected to each other through multiple hierarchical levels of forwarding devices. One or more high level switches may be removed, creating isolated blocks of forwarding devices. The blocks may be connected by the remaining original high level Clos-style topology switch(es) and a second type of network topology. In an exemplary embodiment, traffic may be scheduled over routes with the following decreasing priorities: (1) the shortest path, using either or both network topologies; (2) a path using only a single network topology type; (3) non-shortest paths between directly-connected blocks; and (4) non-shortest paths between indirectly-connected blocks.

23 Claims, 9 Drawing Sheets

TRAFFIC LOAD BALANCING IN A MULTI-CONNECT TOPOLOGY

BACKGROUND

In communications networks, information may be forwarded from one device to another through intermediate forwarding devices, such as switches. In some networks, links connecting the forwarding devices may serve to arrange the forwarding devices into a topology. The topology defines the overall arrangement of forwarding devices with respect to each other, and the connections between forwarding devices or groups of forwarding devices. In other words, the network topology describes which forwarding devices connect to which other forwarding devices in the network, thereby defining the structure or geometry of the network.

Figure 1:
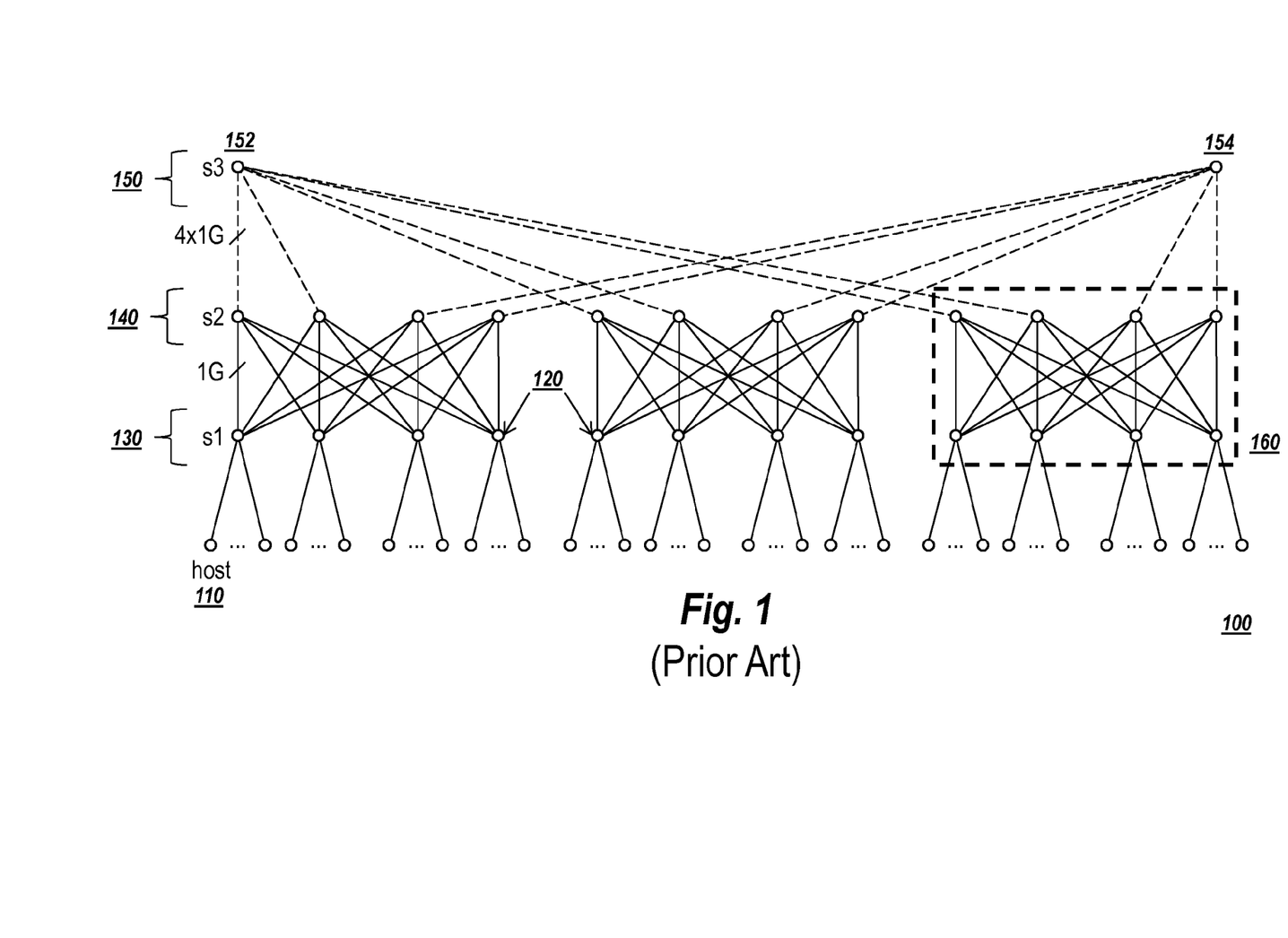
FIG. 1 depicts an example of a communications network having a single type (Clos) of topology.

Different types of network topologies may be used, such as grid, torus, interconnect, and Clos topologies. Each type of topology may have advantages and disadvantages for different applications. For example, multi-stage Clos topologies are often employed in data center networks in order to provide full bandwidth connectivity between pairs of servers. FIG. 1 depicts an example of a Clos-style network.

In the network 100, hosts 110 send information to each other through forwarding devices 120. The hosts 110 may be, for example, computers, mobile phones, tablets, servers, or any other suitable device for sending and/or receiving information. The forwarding devices 120 may represent, for example, switches or any other suitable device for forwarding information to or from a device, such as a host 110 or another forwarding device 120.

In a Clos topology, the forwarding devices 120 may be arranged into two or more stages or hierarchical layers 130, 140, 150. In exemplary Clos topologies, the stages may be defined such that a device at a given stage is connected to some or all of the devices at the next stage. In some cases, the devices may be separated into blocks 160 such that connections between two stages (such as the first stage 130 and the second stage 140 in FIG. 1) are made within the block, but not directly between blocks at the stages in question.

Connections between blocks may be provided by devices at higher hierarchical levels. In the example of FIG. 1, the blocks between the first stage 130 and the second stage 140 are connected to each other via high-level forwarding devices 152, 154 at a third stage 150 of the hierarchy. The third stage 150 forwarding devices may be, for example, switches collectively delivering full bisection bandwidth between the second stage 140 forwarding devices.

A Clos arrangement may result in a great deal of interconnectedness within a block 160, such as the blocks connecting stages 1 and 2 in FIG. 1.

One disadvantage of a Clos topology is the relatively high expense of this arrangement. At high levels of the hierarchy (e.g., the third stage 150 in FIG. 1), the forwarding devices 152, 154 must handle large amounts of traffic and are therefore typically complex and expensive devices.

SUMMARY

Exemplary embodiments described herein provide traffic load balancing in a hybrid topology network. By employing the load balancing techniques described herein, the network topology can be reconfigured into a hybrid form to reduce the number of expensive network elements, such as high-level forwarding devices. For example, one or more high level forwarding devices may be removed, e.g. from a Clos-style network, while new interconnects between blocks may be provided. Traffic loads may be balanced between intra-topology routes and inter-topology routes.

Exemplary embodiments may attempt to reduce or minimize a bandwidth*hop count product for paths between hosts in the network. Using the bandwidth*hop count product allows the traffic load of the network to be balanced between shortest paths, single-topology paths, and multi-topology paths. This allows shorter paths to be prioritized while still allowing for the use of longer paths for traffic load balancing when warranted.

According to an exemplary embodiment, a plurality of different network topologies may be provided. The topologies may include a first type of topology and a second type of topology. For example, the first type of topology may be a Clos type of topology, while the second type of topology may be a cross-interconnect type of topology. The first type of network topology may define, at least in part, a plurality of blocks and a plurality of hierarchical layers, and the second type of network topology may connect the plurality of blocks, potentially at a single hierarchical layer.

The network may be made up of a plurality of links between forwarding devices, such as switches, and the forwarding devices may be arranged in a hierarchy such that the links of the first type of network topology are between forwarding devices located at different levels of the hierarchy. The hierarchy may be made up of at least a first tier and a second tier, where the first tier forms blocks that are connected by the second type of network topology. The blocks may further be connected by forwarding devices in the second tier which are linked to the blocks according to the first type of network topology. A list of the blocks and a list of the links may be stored in a storage device.

In one exemplary embodiment, a plurality of paths in the network may be identified. The plurality of paths may be made up of one or more links connecting a source to a destination. Traffic may be scheduled over the plurality of paths, where the plurality of paths are weighted in the following order of decreasing preference: a shortest path; a path comprising one or more links connected according a single type of network topology from among the plurality of different network topologies; and a non-shortest path.

According to one embodiment, scheduling traffic over a non-shortest path may include identifying a first link connecting a first forwarding device of a first block with a second forwarding device of a second block, identifying a second link connecting the second forwarding device of the second block with a third forwarding device of a third block, and forming a path between the first block and the third block using the first link and the second link. Alternatively or in addition, scheduling traffic over the non-shortest path may include identifying a first link connecting a first forwarding device of a first block with a second forwarding device of a second block, identifying a second link connecting a third forwarding device of the second block with a fourth forwarding device of a third block, where the second forwarding device and the third forwarding device are distinct from each other and the second forwarding device and the third forwarding device are connected by an interior path transiting an inner topology of the second block, and forming a path between the first block and the third block using the first link, the second link, and the interior path.

In one embodiment, network traffic from a source node to a destination node may be scheduled using one or more of the links in the list of links, where the links used to schedule the network traffic consist of links connected according to the first network topology. The list of links may include only links connecting the blocks according to the first type of network topology. Alternatively, the links used to schedule the network traffic may consist of links connected according to the second network topology, and the list may include only links connecting the blocks according to the first type of network topology.

Exemplary embodiments may be embodied as methods executable in a computing device, as non-transitory device readable mediums storing instructions, and as computing systems, among other possibilities.

DETAILED DESCRIPTION

One possible solution to the issue of expense in single-topology networks is to employ a hybrid topology. For example, the network 100 of FIG. 1 may be modified to remove one of the two third stage 150 forwarding devices 152, 154. In place of the connections lost due to the removed forwarding device, the stage 2 forwarding devices may be directly connected using a cross-interconnect topology. Such a hybrid network topology is shown in FIG. 2.

Figure 2:
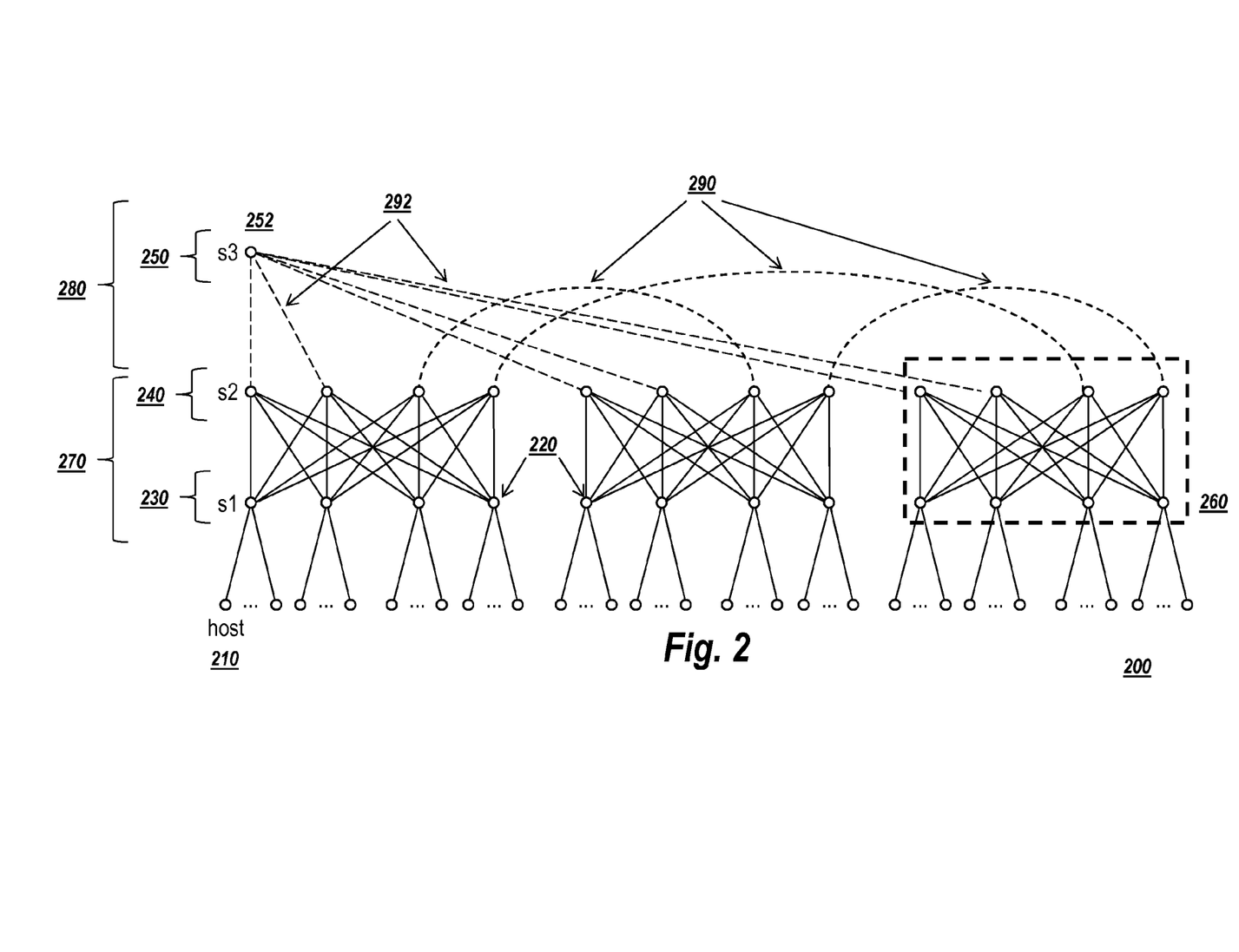
FIG. 2 depicts a multi-connect topology suitable for use with exemplary embodiments.

In FIG. 2, the network 200 is broken into three hierarchical layers 230, 240, 250. A hierarchical layer refers to the multiple stages of forwarding devices 220 (note that, for clarity, FIG. 2 highlights only two representative forwarding devices, although several additional forwarding devices are present in the Figure). At the base of the network 200 is a layer of leaf nodes, also known as hosts 210. A first hierarchical layer 230 of forwarding devices 220 consists of stage 1 forwarding devices, such as switches or routers. A second hierarchical layer 240 and a third hierarchical layer 250 consist of stage 2 forwarding devices and stage 3 forwarding devices, respectively.

Data in the network may be routed from a node, such as a forwarding device or host, in one hierarchical layer to a node in an adjacent hierarchical layer. In some embodiments, the forwarding devices in, and connections between, two or more hierarchical layers may further be divided into blocks 260. A block 260 may refer to a group of nodes which are strongly connected within the block, but containing only limited connections to other nodes located in other blocks. For example, within a block 260 in a Clos topology, most or all nodes in one hierarchical layer (e.g., the first hierarchical layer 230) may be individually connected to most or all nodes in an adjacent hierarchical layer (e.g., the second hierarchical layer 240). Alternatively or in addition, the nodes of one hierarchical layer may be connected to a limited subset of the nodes in an adjacent hierarchical layer (as in the case of the connections between the layer of leaf nodes 210 and the first hierarchical layer 230 of stage 1 forwarding devices). Blocks 260 may be connected to each other through another hierarchical layer (as in the example of a Clos topology, in which the blocks 260 are connected at the third hierarchical layer 250) or at the same hierarchical layer (as in the example of a cross-interconnect topology, in which the blocks 260 are connected to each other at the second hierarchical layer 240).

The hierarchical layers in the exemplary network 200 further define two tiers 270, 280. A tier may refer to a group of forwarding devices and connections logically organized together and spanning one or more hierarchical levels. In exemplary embodiments, the network 200 may include two tiers: a first tier 270 defining a series of blocks 260, and a second tier 280 defining connections between the blocks 260.

For example, the network 200 includes a first tier 270 having three blocks 260, each of which is a 3-stage Clos having 16 leaf nodes 210 as hosts. A subset of second stage 240 forwarding devices 220 at the top stage of each block 260 may be directly connected (using a cross-interconnect topology) to the second stage 240 forwarding devices 220 of other blocks 260. The direct connections may be in the form of cross-interconnect links 290. The remaining second stage 240 forwarding devices 220 may be connected to a third stage 250 forwarding device 252 in the second tier 280 of the network 200 using Clos links 292 (for clarity and ease of presentation, only two of the six pictured Clos links 292 are labeled in FIG. 2).

In the hybrid topology of FIG. 2, there exist multiple paths of different distance between respective source and destination nodes in the network. In order to route network traffic, an appropriate path must be selected for the traffic, e.g. using a load-balancing algorithm. In an ideal network, it may be desirable to always route traffic on the shortest path between a source and a destination. However, the shortest path alone may not satisfy a maximum bandwidth requirement of all traffic patterns (such as a bijective mapping between the hosts in two different blocks).

Exemplary embodiments described herein provide a greedy algorithm that schedules traffic over the following possible routes in the network with the following decreasing priorities: (1) the shortest path, using either or both network topologies; (2) a path using only a single network topology type (e.g., Clos-only paths); and (3) non-shortest paths between blocks. The greedy algorithm attempts to reduce or minimize a bandwidth*hop product for the traffic in the network, thereby allowing shorter paths to be prioritized while still allowing for the use of longer paths for traffic load balancing when warranted.

For example, each link in FIG. 2 is associated with a bandwidth capacity. In FIG. 2, the links at the first tier 270 (e.g., the links connecting the stage 1 forwarding devices to the stage 2 forwarding devices) may be 1 Gbps links. The links at the second tier 280 (e.g., the links connecting the stage 2 forwarding devices to the stage 3 forwarding devices) may be 4 Gbps links.

By weighted distribution of traffic among the above-identified paths, exemplary embodiments improve traffic throughput while limiting any latency increase for the associated traffic. In addition, by reducing the bandwidth*hop product consumed by traffic flows, exemplary embodiments leave more link bandwidth available for serving additional traffic demand.

Figure 3:
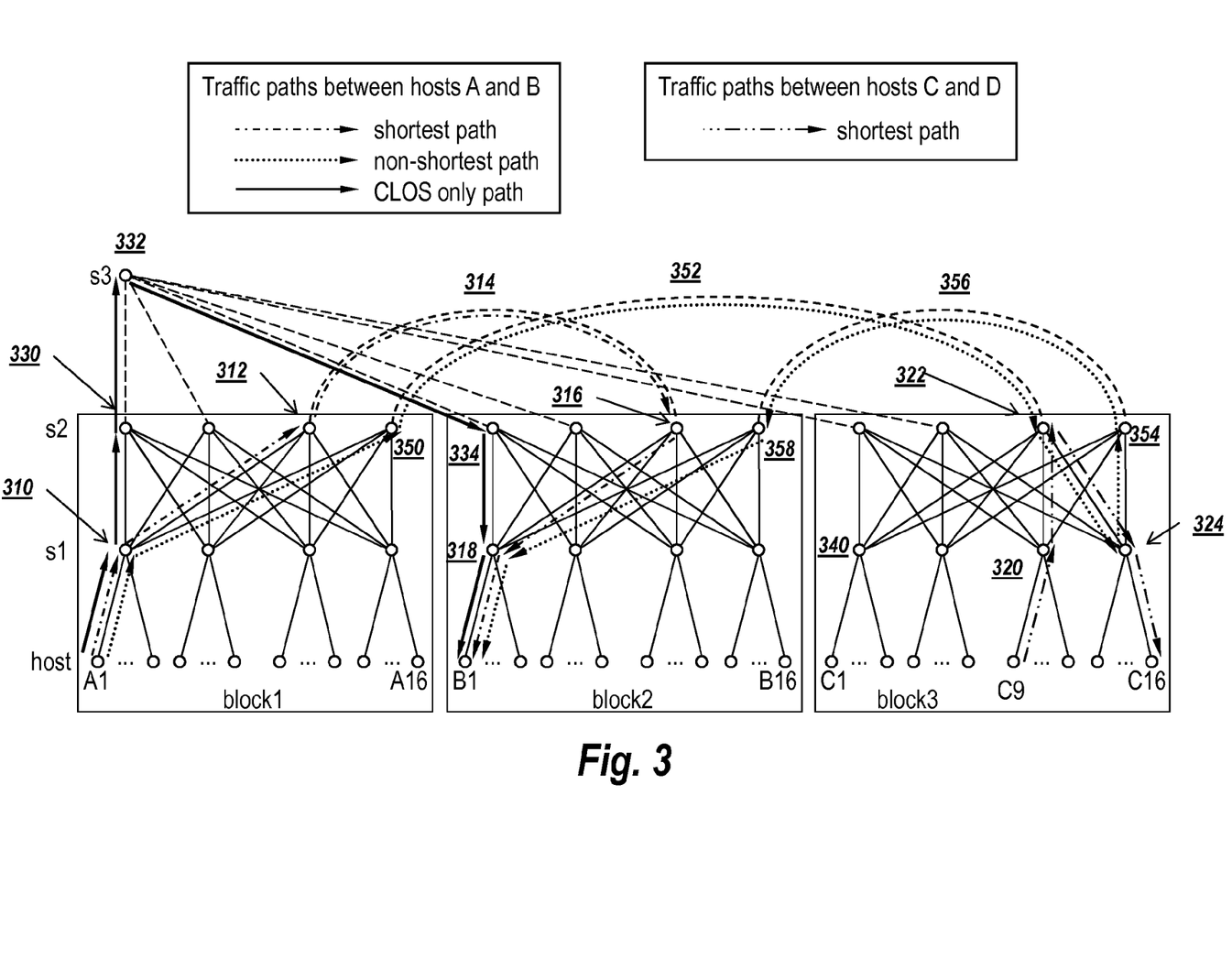
FIG. 3 depicts different types of exemplary routes available in the multi-connect topology of FIG. 2.

Examples of the multiple types of paths available for route selection are depicted in FIG. 3.

A shortest path between hosts is a path that minimizes the number of hops (e.g., forwarding devices encountered on the path) between the hosts. For example, a shortest path between the host A1 and the host B1 traverses the block 1 stage 1 forwarding device 310 using a Clos link and the block 1 stage 2 forwarding device 312 using a Clos link. Traffic may then be routed over the cross-interconnect link 314 connecting the block 1 stage 2 forwarding device 312 with the block 2 stage 2 forwarding device 316. Traffic may then be routed to the block 2 stage 1 forwarding device 318, and from there to the host B1. This path uses five hops to reach the host B1 from the host A1.

Another example of a shortest path, this time between two hosts in block 3, directs traffic from the host C9 to the block 3 stage 1 forwarding device 320 using a Clos link and the block 3 stage 2 forwarding device 322 using a Clos link. Traffic may then be routed to the block 3 stage 1 forwarding device 324, and from there to the host C16.

A path using a single type of network topology is a path in which the connections between hosts that are used by the path are connected according to only one of the network topologies of the hybrid network (e.g., Clos-only links in a hybrid Clos and cross-interconnect network). A path using a single type of network topology may or may not also be a shortest path. For example, a path connecting the host A1 with the host B1 using a single type of network topology traverses the block 1 stage 1 forwarding device 310 using a Clos link and the block 1 stage 2 forwarding device 330 using a Clos link. Traffic may then be routed to the stage 3 forwarding device 332 in the second tier of the network, which connects block 1 with block 2 through the block 2 stage 2 forwarding device 334. Traffic may then be routed to the block 2 stage 1 forwarding device 318, and from there to the host B1.

A non-shortest path is a path that does not minimize the number of hops between the hosts, and may connect the host of a first block with the host of a second block by traversing at least one other intermediate block that is not the first block or the second block. This intermediate block may be referred to as a transit block. In exemplary embodiments, two types of non-shortest paths may be considered: non-shortest paths using only a forwarding device in the transit block that directly connects the source block to the destination block, and non-shortest paths using interior links in the transit block (such as links of the first type of network topology).

In the first type of non-shortest path (a non-shortest path using only the forwarding devices that directly connect the source block to the destination block), the path may be formed by using two links that directly connect three blocks. The first link may be formed between the first block and a forwarding device of the second (transit) block, and the second link may be formed between the same forwarding device in the second (transit) block and the third block. Thus, the first type of non-shortest path utilizes only the forwarding device at the outer edge of the transit block to forward traffic from the first block and the third block.

For example, although not shown in FIG. 3 for the sake of clarity, assume that a fourth cross-interconnect link (of the second type of network topology) connects the block 2 stage 2 forwarding device 316 with the block 3 stage 2 forwarding device 322. A non-shortest path using only forwarding devices that directly connect the host A1 with the host C1 might then be formed as follows: from the host A1 to the block 1 stage 1 forwarding device 310; from the block 1 stage 1 forwarding device 310 to the block 1 stage 2 forwarding device 312; from the block 1 stage 2 forwarding device 312 to the block 2 (transit block) stage 2 forwarding device 316 over the interconnect link 314; from the block 2 stage 2 forwarding device 316 to the block 3 stage 2 forwarding device 322 over the above described (un-illustrated) fourth cross-interconnect link; from the block 3 stage 2 forwarding device 322 to the block 3 stage 1 forwarding device 340; and from the block 3 stage 1 forwarding device to the host C1.

In the second type of non-shortest path (a non-shortest path using interior links in the transit block), the source block may be connected to the transit block through a different forwarding device different than the forwarding device that connects the transit block to the destination block. Accordingly, information may be routed inside the transit block from a first forwarding device (connecting the source block to the transit block) to a second forwarding device (connecting the transit block to the destination block). In some embodiments, this internal routing may be performed using only the first type of network topology.

As an example of the second type of non-shortest path (a non-shortest path using interior links in the transit block), a path connecting the host A1 with the host B1 traverses the block 1 stage 1 forwarding device 310 using a Clos link, and the block 1 stage 2 forwarding device 350 using a Clos link. Traffic may then be routed over the cross-interconnect link 352 connecting the block 1 stage 2 forwarding device 350 with the block 3 (transit block) stage 2 forwarding device 322. The traffic may then be routed to the block 3 stage 1 forwarding device 320, to the block 3 stage 2 forwarding device 354 (using the internal Clos links of block 3), and then may be routed from block 3 to the block 2 stage 2 forwarding device 358 using the cross-interconnect link 356. Traffic may then be routed to the block 2 stage 1 forwarding device 318, and from there to the host B1. This path uses eight hops to reach the host B1 from the host A1.

In embodiments using both types of non-shortest paths (edge-only paths and interior paths), edge-only paths may be favored over interior paths by assigning edge-only paths in the greedy algorithm prior to assigning interior paths.

According to exemplary embodiments, traffic may be routed onto the above-described different types of paths in decreasing order of priority. FIGS. 4A-4E depict an exemplary method for performing load balancing among the different types of paths described above.

In FIGS. 4A-4E, a 2-tier multi-stage network as illustrated FIGS. 2-3 is assumed solely for simplicity and clarity of explanation. Nonetheless, the exemplary method described may be generalized to any multi-stage or multi-topology networks. The exemplary method takes the network topology and traffic demand as inputs, and computes the weighted distribution of inter-block traffic among the multiple paths.

The inputs to the method are as follows:

D: traffic demand matrix; Each element D[i][j] (i<=N and j<=N) indicates the traffic demand between block i and block j.

Din: each element Din[i] indicates the aggregate demand of inter-block traffic destined to each block i Dout: each element Dout[i] indicates the aggregate demand of inter-block traffic originated from block i E: the set of links in the cross interconnect; Each link e in E has a few attributes including its available capacity, source/destination switch node, denoted as e.capacity, e.src_node, e.dst_node. The block number of two end switch nodes can be obtained by function call block_num(e.src_node) and block_num(e.dst_node).

IntraBlockBw: each element IntraBlockBw[i] indicates the bisection b/w of internal Clos topology within block i.

UplinkSetClos: each element UplinkSetClos[i] is a set of uplinks from block i connected to switches at the 2nd tier.

As an output, for each pair of two blocks i and j, exemplary embodiments compute a load balancing rule for traffic demand between the two blocks over multiple paths, denoted as Sij. Sij is expressed as a set of tuples (P, r), each of which specifies that r amount of traffic demand from block i to block j can be scheduled over the path P.

It should be noted that the exemplary embodiments assign traffic to the links connecting the blocks, and does not attempt to schedule traffic on the links (e.g., links of the first type of network topology, such as Clos links) within the blocks. Nonetheless, it will be readily apparent to one of ordinary skill in the art how to route intra-block traffic so that the traffic arrives at the scheduled inter-block link appropriately (e.g., by taking the shortest intra-block route between nodes).

Figure 4A:
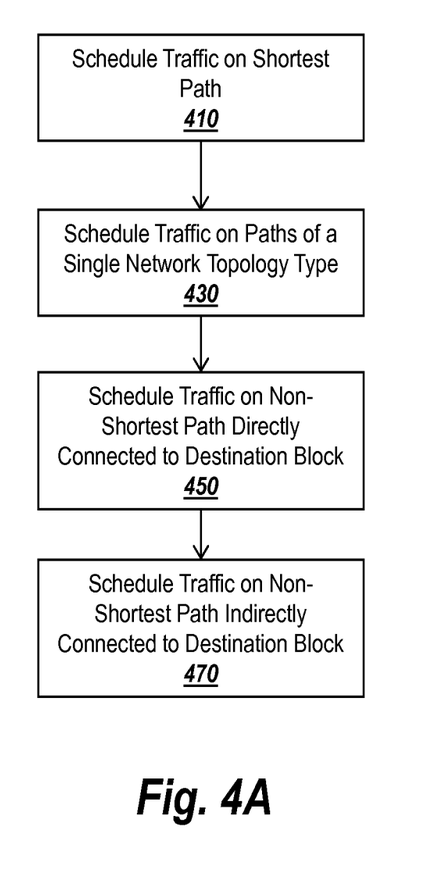
FIG. 4A is a flowchart of a high-level exemplary process for performing traffic load balancing in a multi-connect topology according to an exemplary embodiment.

As shown in FIG. 4A, the exemplary method runs in several steps. In each step, a designated amount of inter-block traffic that can be scheduled on each of three types of paths is scheduled. The three types of paths may include: shortest paths, Clos only paths, and non-shortest paths.

The designated amount of inter-block traffic may be, for example, the maximum amount of inter-block traffic that may be handled by the inter-block links (i.e., the link capacity). Alternatively, the designated amount may be a predetermined fraction of the maximum amount of inter-block traffic that may be handled by the inter-block links, thus providing some leeway in the amount of traffic handleable by the link.

By increasing the path hop count from the first to the last step, exemplary embodiments prioritize shorter paths over longer paths for routing traffic. Such prioritization reduces the bandwidth*hop product consumed by traffic flows and leave more link bandwidth available for additional other traffic demands.

Thus, at step 410, traffic may be scheduled onto the shortest paths in the network. Once the designated amount of traffic has been assigned to the shortest paths, at step 430 traffic may be scheduled onto paths of a single network topology type. Once the designated amount of traffic has been assigned to the paths of a single network topology type, at steps 450 and 470 traffic may be scheduled on non-shortest paths in the network (non-shortest directly-connected paths and non-shortest indirectly-connected paths, respectively). Each of these steps will be described in more detail with reference to FIGS. 4B-4E.

Figure 4B:
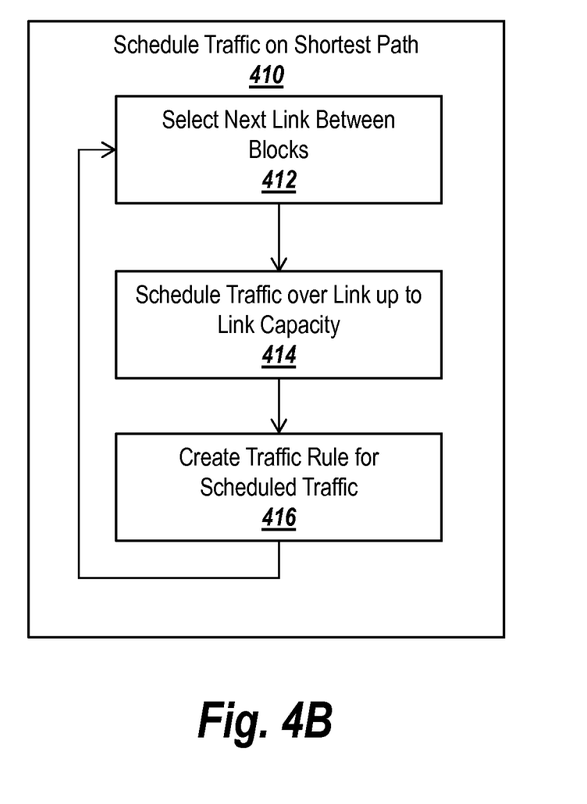
FIGS. 4B-4E are flowcharts depicting the steps of FIG. 4A in more detail, according to exemplary embodiments.

FIG. 4B depicts steps for scheduling traffic on shortest paths in the network. Beginning with a list of links connecting two blocks in the network, at step 412 the next link in the list is selected. At step 414, a capacity of the link may be determined, and an amount of traffic up to the link capacity (or the designated amount for the link, if the designated amount is less than the link capacity) may be scheduled for the link. At step 416, a traffic rule for the traffic scheduled onto the link may be created and may be sent to forwarding devices connected to the link.

Accordingly, each link connecting two blocks in the network (which, being a single hop between the blocks, is necessarily the shortest path between the blocks) is assigned the link's designated capacity first among the available links in the network.

Pseudo-code for scheduling traffic over the shortest paths may be expressed as follows:

```
Step 410: Schedule maximum inter-block traffic over the shortest paths.
   // Step 412:
   for (Link e = E.begin( ); e != E.end( ); e = E.next( ))
   {
       // Step 414:
       traffic_scheduled =
           min(e.capacity,D[block_num(e.src_node)][block_num
           (e.dst_node)]);
       e.capacity -= traffic_scheduled;
       D[block_num(e.src_node)][block_num(e.dst_node)] -= e.capacity;
       P = {e};
       // Step 416:
       S[block_num(e.src_node)][block_num(e.dst_node)].insert(P,
       traffic_scheduled); }
```

Figure 4C:
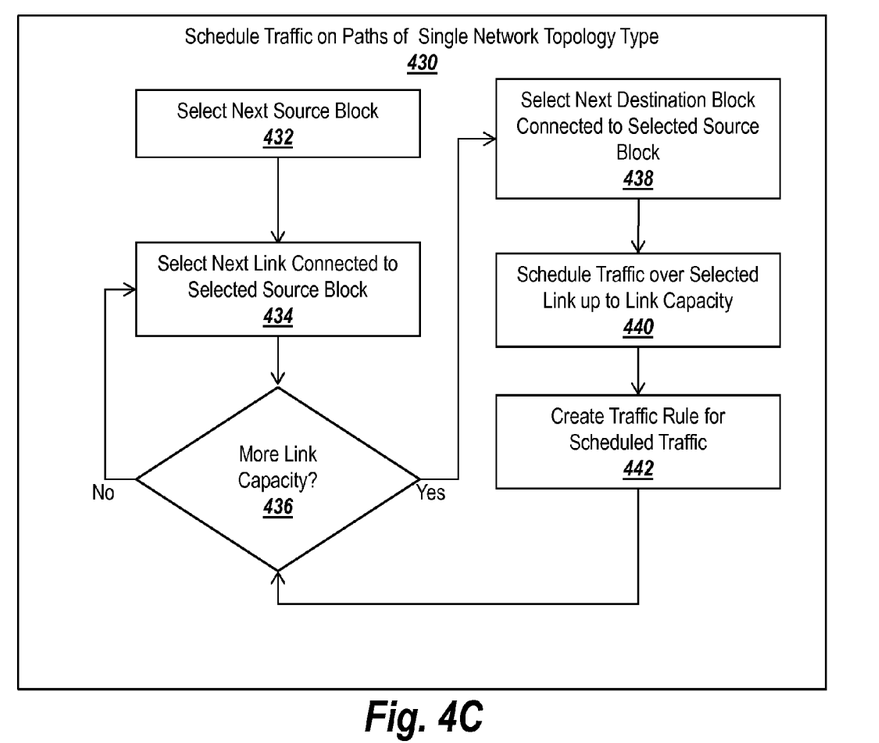

FIG. 4C depicts steps for scheduling traffic over paths of a single network topology type (e.g., the first network topology type, or Clos-only paths). At step 432, the next source block is selected from among the possible source blocks in the network. At step 432, the next first-topology type link that is connected to the selected source block may be selected. The first-topology type links may be included in a list, such as the UplinkSetClos list described above.

At step 436, it may be determined whether the selected link has any more available capacity (e.g., unassigned capacity that has not been assigned to the link at step 410 or in previous loops of step 430). If the selected link does not have any more link capacity, then processing may proceed to step 434 and the next link in the list may be selected. If the selected link does have more capacity, and there remain additional destination blocks connected to the source block through the selected link via the first type of topology, then processing may proceed to step 438.

At step 438, the destination block connected to the selected source block via the selected link may be selected. At step 440, traffic between the selected source block and the selected destination block may be scheduled on the selected link, up to the link's capacity (or the designated amount, if the designated amount is less than the link capacity).

At step 442, a traffic rule for the scheduled traffic may be created. Processing may then return to step 436, at which point the link may be evaluated to determine whether any additional capacity exists on the link. The process may repeat until the link is filled to capacity (or no remaining destination blocks are reachable from the source block using the selected link over the first type of topology.

Pseudo-code for scheduling traffic over paths of a single network topology type (e.g., the first network topology type, or Clos-only paths) may be expressed as follows:

```
Step 430: Schedule maximum inter-block traffic over first-topology-only
(e.g., Clos-only) paths
   // Step 432:
   for (int src_block = 0; src_block < N; src_block++)
   {
       int dst_block = 0;
       if (dst_block == src_block) dst_block++;
       // Step 434:
       for (Link e = UplinkSetClos[src_block].begin( ); e !=
       UplinkSetClos[src_block].end( );
           e = UplinkSetClos[src_block].next( ))
       {
           // Steps 436 & 438:
           while (dst_block < N && e.capacity)
           {
```

-continued

```
// Step 440:
        traffic_scheduled = min(e.capacity, D[src_block][dst_block])
        e.capacity -= traffic_scheduled
        D[src_block][dst_block] -= traffic_scheduled
        P = {e}
        // Step 442:
        S[src_block][dst_block].insert(P, traffic_scheduled)
        // Part of Step 438:
        if (D[src_block][dst_block] == 0 || src_block == dst_block)
          dst_block++
      }
    }
  }
}
```

Figure 4D:
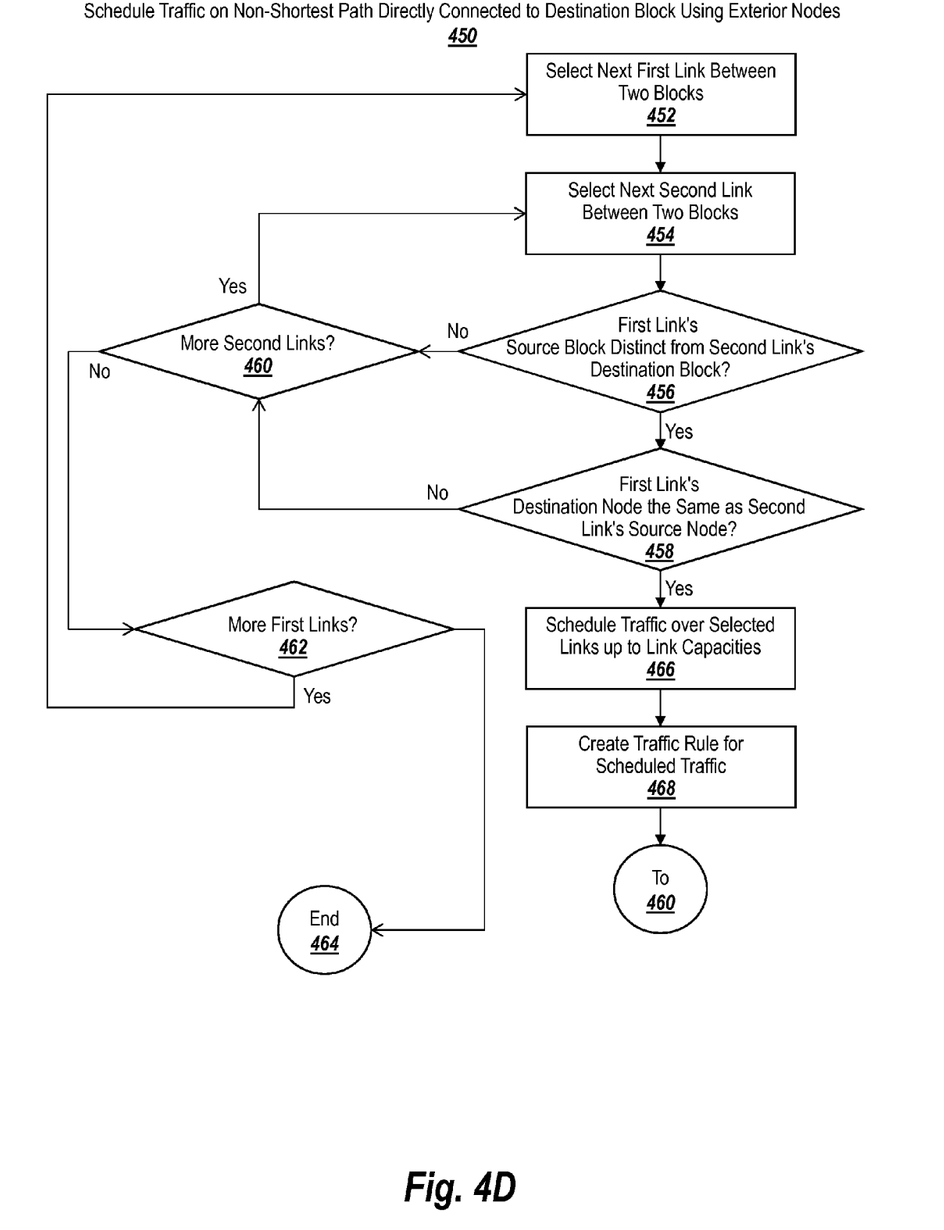

FIG. 4D depicts steps for scheduling traffic over paths on non-shortest paths directly connected to a destination block through a transit block, using only exterior nodes of the transit block.

At step 452, the next "first link" between two blocks is selected. The first link may be a candidate link for carrying traffic, where the first link is a link of the second type of network topology and connects the source block to the transit block.

At step 454, the next "second link" between two blocks is selected. The second link may be a candidate link for carrying traffic, where the second link is a link of the second type of network topology and connects the transit block to the destination block.

At step 456, it is determined whether the source block of the first link is distinct from the destination block of the second link. If this condition evaluates to "no" or "false," then this means that the two links in question reverse each other (e.g., the first link connects the source block to the transit block, while the second link connects the transit block back to the source block). In this case, the links cannot connect the source block directly to the destination block through the transit block. Although such a link could, conceivably, be used to form a route from the source block to the destination block (e.g., source block to the transit block, transit block back to the source block, and then the source block to the destination block, possibly through additional transit blocks), for ease of discussion such a route is not considered in the currently described exemplary embodiment.

At step 458, it is determined whether the destination node of the first link is the same as the source node of the second link. If is this condition is evaluated to "yes" or "true," then this means that the first link ends where the second link begins. In other words, the source block and the destination block are directly connected through the first and second links by the identified node. The identified node is thus an exterior node of the transit block capable of carrying traffic directly from the source block to the destination block.

If the evaluation at either step 456 or 458 is "no," then processing may proceed to step 460. If there are further second links to consider, then processing may return to step 454 and the next second link may be evaluated. If there are no further second links to consider, then processing may proceed to step 462.

At step 462, it may be determined whether any further first links exist which may be considered. If the evaluation at step 462 is "yes," then processing may return to step 452 and the next first link may be selected for consideration. If the evaluation at step 462 is "no," then there are no additional links to consider. Processing may proceed to step 464 and terminate.

If the evaluation at both of steps 456 and 458 is "yes," then processing may proceed to step 466, where traffic may be scheduled over the selected links, up to the capacities of the selected links. A traffic rule reflecting the scheduling performed in step 466 may be created in step 468. Then, processing may return to step 460 to determine whether any further links exist that may be evaluated.

Pseudo-code for scheduling traffic on non-shortest paths directly connected to a destination block may be expressed as follows:

```
Step 450: Schedule maximum amount of traffic on the non-shortest path
via a transit s3 switch connected to both source and destination blocks.
// Step 452:
for (Link link1 = E.begin( ); link1 != E.end( ); link1 = E.next( ))
{
  // Step 454:
  for (Link link2 = E.begin( ); link2 != E.end( ); link2 = E.next( ))
  {
    // Steps 456 and 458:
    // if link1.dst_node == link2.src_node, the 2 links identify a
    // candidate path for forwarding inter-block traffic between
    // block_num(link1.src_node) and block_num(link2.dst_node)
    if (block_num(link1.src_node) != block_num(link2.dst_node) &&
        link1.dst_node == link2.src_node)
    {
      // Step 466:
      traffic_scheduled = min(link1.capacity, link2.capacity,
          D[block_num(link1.src_node)][block_num(link2.dst_node)]);
      link1.capacity -= traffic_scheduled
      link2.capacity -= traffic_scheduled
      D[block_num(link1.src_node)][block_num(link2.dst_node)] -=
          traffic_scheduled;
      P = {link1, link2}
      // Step 468:
      S[block_num(link1.src_node)][block_num(link2.dst_node)].insert
          (P, traffic_scheduled)
    }
  }
}
```

Figure 4E:
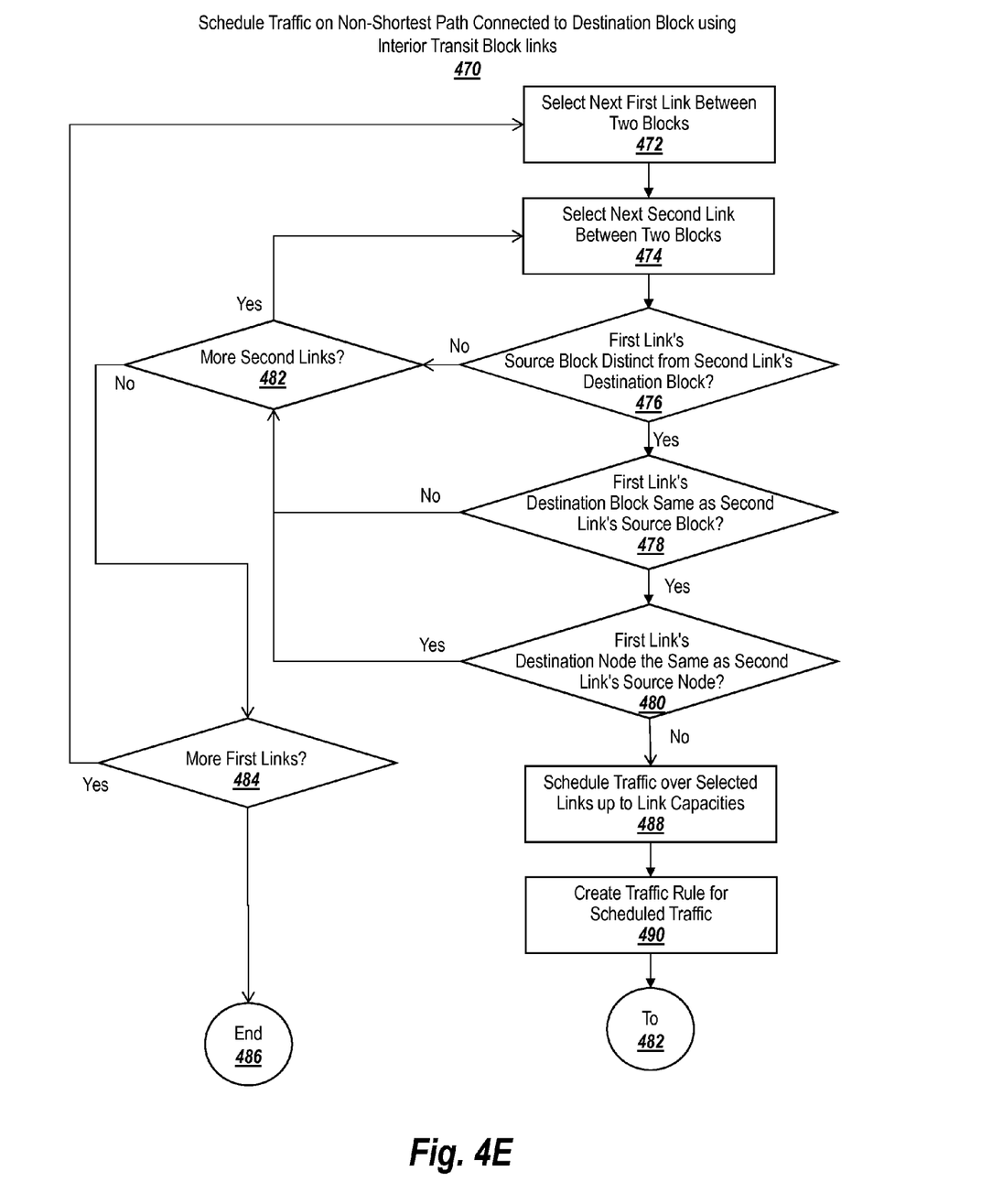

FIG. 4E depicts steps for scheduling traffic over paths on non-shortest paths directly connected to a destination block through a transit block, using interior nodes of the transit block. These steps may schedule remaining inter-block traffic on the non-shortest path passing through the internal Clos of the transit block. To reduce congestion, more traffic may be scheduled on the paths traversing a lightly utilized transit block, as compared to other transit blocks.

At step 472, the next "first link" between two blocks is selected. The first link may be a candidate link for carrying traffic, where the first link is a link of the second type of network topology and connects the source block to the transit block.

At step 474, the next "second link" between two blocks is selected. The second link may be a candidate link for carrying traffic, where the second link is a link of the second type of network topology and connects the transit block to the destination block.

At step 476, it is determined whether the source block of the first link is distinct from the destination block of the second link. If this condition evaluates to "no" or "false," then this means that the two links in question reverse each other (e.g., the first link connects the source block to the transit block, while the second link connects the transit block back to the source block). In this case, the links cannot connect the source block directly to the destination block through the transit block. Although such a link could, conceivably, be used to form a route from the source block to the destination block (e.g., source block to the transit block, transit block back to the source block, and then the source block to the destination block, possibly through additional transit blocks), for ease of discussion such a route is not considered in the currently described exemplary embodiment.

At step 478, it is determined whether the destination block of the first link is the same as the source block of the second link. If this condition is evaluated to "yes," then the destination block of the first link/source block of the second link may qualify as a transit block.

At step 480, it is determined whether the destination node of the first link is the same as the source node of the second link. If is this condition is evaluated to "yes" or "true," then this means that the first link ends where the second link begins. Because the present step 470 is seeking paths that use the interior links of the transit block, this is not an example of a suitable set of links for this step (although it may have been a suitable set of links for use in step 450, which sought directly-connected blocks using only exterior nodes). Alternatively, if the destination node of the first link is not the same as the source node of the second link, then the first and second link may be reachable through the internal links of the transit block (e.g., the internal links of the first type of network topology, such as Clos links, of the transit block).

If the evaluation at either step 476 or 478 is "no," or if the evaluation at step 480 is "yes," then processing may proceed to step 482. If there are further second links to consider, then processing may return to step 454 and the next second link may be evaluated. If there are no further second links to consider, then processing may proceed to step 484.

At step 484, it may be determined whether any further first links exist which may be considered. If the evaluation at step 484 is "yes," then processing may return to step 472 and the next first link may be selected for consideration. If the evaluation at step 484 is "no," then there are no additional links to consider. Processing may proceed to step 486 and terminate.

If the evaluation at both of steps 476 and 478 is "yes," and the evaluation at step 480 is "no," then processing may proceed to step 488, where traffic may be scheduled over the selected links, up to the capacities of the selected links. A traffic rule reflecting the scheduling performed in step 488 may be created in step 490. Then, processing may return to step 482 to determine whether any further links exist that may be evaluated.

Pseudo-code for scheduling traffic on non-shortest paths indirectly connected to a destination block may be expressed as follows:

```
Step 470:
  for (block = 0; block < N; block++)
  {
    block_residue_bw[block_num(link1.dst_node)] =
      IntraBlockBw[block] - max(Din[block], Dout[block]) -
      D[block][block]
  }
  // Step 472:
  for (Link link1 = E.begin( ); link1 != E.end( ); link1 = E.next( ))
  {
    // Step 474:
    for (Link link2 = E.begin( ); link2 != E.end( ); link2 = E.next( ))
    {
      // Steps 476, 478, and 480:
      // If link1.dst_node != link2.src_node, the two links identify a path
      // that traverses multiple hops within the cross inter-connect and
      // within the internal Clos topology of block_num(link1.dst_node)
      if (block_num(link1.src_node) != block_num(link2.dst_node) &&
          block_num(link1.dst_node) == block_num(link2.src_node)) &&
          link1.dst_node != link2.src_node)
```

-continued

```
      {
        // Step 488:
        traffic_scheduled = min(link1.capacity, link2.capacity,
          D[block_num(link1.src_node)][block_num(link2.dst_node)],
          block_residue_bw[block_num(link1.dst_node)]);
        link1.capacity -= traffic_scheduled
        link2.capacity -= traffic_scheduled
        D[block_num(link1.src_node)][block_num(link2.dst_node)] -=
          traffic_scheduled;
        block_residue_bw[block_num(link1.dst_node)] -=
          traffic_scheduled;
        P = {link1, link2}
        // Step 490:
        S[block_num(link1.src_node)]
          [block_num(link2.dst_node)].insert(P, traffic_scheduled)
      }
    }
  }
```

Thus, by applying steps 410, 430, 450, and 470 in order, a greedy algorithm may be established which schedules traffic over different types of paths in decreasing order of priority. The exemplary embodiment described above is a greedy solution and runs in strongly polynomial time. Exemplary embodiments need not generate the best possible load-balancing solution that leads to the highest possible traffic throughput. Such optimal solutions may require traffic to be routed over even longer paths (e.g., paths traversing two or more intermediate blocks). Identifying such optimal solution is an NP-hard problem.

Figure 5:
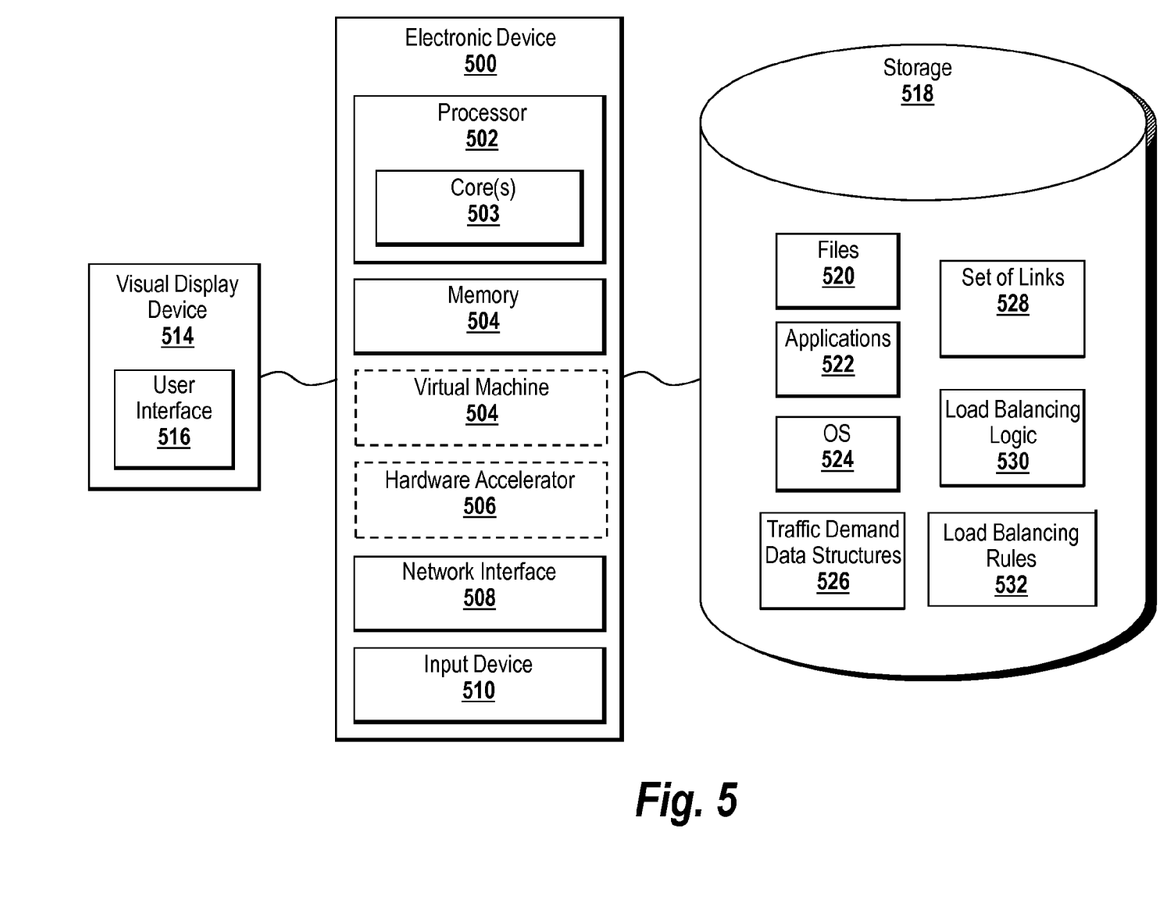
FIG. 5 depicts an exemplary computing device suitable for use with exemplary embodiments.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 5 depicts an example of an electronic device 500 that may be suitable for use with one or more acts disclosed herein.

The electronic device 500 may take many forms, including but not limited to a switch, a router, a computer, workstation, server, network computer, Internet appliance, mobile device, a pager, a tablet computer, a smart sensor, application specific processing device, etc.

The electronic device 500 is illustrative and may take other forms. For example, an alternative implementation of the electronic device 500 may have fewer components, more components, or components that are in a configuration that differs from the configuration of FIG. 5. The components of FIG. 5 and/or other figures described herein may be implemented using hardware based logic, software based logic and/or logic that is a combination of hardware and software based logic (e.g., hybrid logic); therefore, components illustrated in FIG. 5 and/or other figures are not limited to a specific type of logic.

The processor 502 may include hardware based logic or a combination of hardware based logic and software to execute instructions on behalf of the electronic device 500. The processor 502 may include logic that may interpret, execute, and/or otherwise process information contained in, for example, the memory 504. The information may include computer-executable instructions and/or data that may implement one or more embodiments of the invention. The processor 502 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 503. Moreover, the processor 502 may include a system-on-chip (SoC) or system-in-package (SiP).

The electronic device 500 may include one or more tangible non-transitory computer-readable storage media for storing one or more computer-executable instructions or software that may implement one or more embodiments of the invention. The non-transitory computer-readable storage media may be, for example, the memory 504 or the storage 518. The memory 504 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 500 may include a virtual machine (VM) 505 for executing the instructions loaded in the memory 504. A virtual machine 505 may be provided to handle a process running on multiple processors so that the process may appear to be using only one computing resource rather than multiple computing resources. Virtualization may be employed in the electronic device 500 so that infrastructure and resources in the electronic device may be shared dynamically. Multiple VMs 505 may be resident on a single computing device 500.

A hardware accelerator 506, may be implemented in an ASIC, FPGA, or some other device. The hardware accelerator 506 may be used to reduce the general processing time of the electronic device 500.

The electronic device 500 may include a network interface 508 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 508 may include a built-in network adapter, network interface card, personal computer memory card international association (PCMCIA) network card, card bus network adapter, wireless network adapter, universal serial bus (USB) network adapter, modem or any other device suitable for interfacing the electronic device 500 to any type of network capable of communication and performing the operations described herein.

The electronic device 500 may include one or more input devices 510, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 500 may include other suitable I/O peripherals.

The input devices 510 may allow a user to provide input that is registered on a visual display device 514. A graphical user interface (GUI) 516 may be shown on the display device 514.

A storage device 518 may also be associated with the computer 500. The storage device 518 may be accessible to the processor 502 via an I/O bus. The information may be executed, interpreted, manipulated, and/or otherwise processed by the processor 502. The storage device 518 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 518 may further store applications 522, and the electronic device 500 can be running an operating system (OS) 524. Examples of OS 524 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

In addition, the storage device 518 may store logic and/or files relating to the above-described traffic demand data structures 526 and a set of links 528. Traffic demand data structures 526 and set of links 528 may include, for example, the traffic demand matrix, the aggregate demand of inter-block traffic destined to and originated from each block, the set of links in the second network topology, and information related to the first network topology (such as the set of links in the first network topology and the bisection bandwidth of internal first-topology links within a block).

The storage device 518 may store load balancing logic 530, such as logic for carrying out the steps described above in FIGS. 4A-4E. As an output of the load balancing logic 530, the storage may store load balancing rules 532, such as the tuples (P, r) described above with respect to FIG. 4A.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

What is claimed is:

1. A method comprising:
   identifying a plurality of paths in a network comprising a plurality of forwarding devices interconnected by links, the links including
      a first plurality of links arranged in accordance with a first type of network topology and
      a second plurality of links arranged in accordance with a second type of network topology,
      wherein the plurality of paths each use a respective set of links connecting a source device to a destination device, each respective set of links using links from the first plurality of links, the second plurality of links, or a combination of the first and second plurality of links;
   creating a set of traffic rules for scheduling traffic over the plurality of paths based on path weights, wherein each of the plurality of paths are weighted in the following order of decreasing preference:
      a shortest path;
      a path comprising one or more links from only one of the first plurality of links or the second plurality of links; and
      a non-shortest path using links from the combination of the first and second plurality of links; and
   configuring the plurality of forwarding devices to forward packets using the set of traffic rules.

2. The method of claim 1, wherein the first type of network topology is a Clos type of topology.

3. The method of claim 1, wherein the second type of network topology is a cross-interconnect topology.

4. The method of claim 1, wherein one or more of the forwarding devices of the plurality of forwarding devices are switches.

5. The method of claim 1, wherein:
   the plurality of forwarding devices are arranged in a hierarchy comprising a first tier and a second tier, wherein
   the first tier comprises blocks of forwarding devices connected according to the second type of network topology, and
   the second tier comprises forwarding devices linked to the blocks according to the first type of network topology.

6. The method of claim 1, wherein the first type of network topology defines a plurality of blocks and the second type of network topology connects the plurality of blocks.

7. The method of claim 6, wherein scheduling traffic over the non-shortest path comprises:
   identifying a first link connecting a first forwarding device of a first block with a second forwarding device of a second block;
   identifying a second link connecting the second forwarding device of the second block with a third forwarding device of a third block; and
   forming a path between the first block and the third block using the first link and the second link.

8. The method of claim 6, wherein scheduling traffic over the non-shortest path comprises:
   identifying a first link connecting a first forwarding device of a first block with a second forwarding device of a second block;
   identifying a second link connecting a third forwarding device of the second block with a fourth forwarding device of a third block, wherein:
      the second forwarding device and the third forwarding device are distinct from each other, and
      the second forwarding device and the third forwarding device are connected by an interior path transiting an inner topology of the second block; and
   forming a path between the first block and the third block using the first link, the second link, and the interior path.

9. A system for use in a network described by a plurality of different types of network topologies, the plurality of different types of network topologies comprising a first type of network topology and a second type of network topology, the plurality of different types of network topologies defining a plurality of network blocks and the second type of network topology defining at least one connection between the plurality of network blocks not conforming with the first type of network topology, the system comprising:
   a non-transitory computer readable memory storing executable instructions; and
   a processor configured to access memory storing a list of the network blocks, and a list of links connecting the network blocks, wherein the executable instructions, when executed by the processor, cause the processor to:
      identify a plurality of paths in the network from a source node in a first network block to a destination node in a second network block using one or more of the links in the list of links connecting the network blocks;
      create a set of traffic rules for scheduling traffic over the plurality of paths, wherein the links used to schedule the network traffic consist only of links connected according to the first type of network topology; and
      configure a forwarding device in the network to forward packets using the set of traffic rules.

10. The system of claim 9, wherein the first type of network topology is a Clos type of topology.

11. The system of claim 9, wherein the second type of network topology is a cross-interconnect topology.

12. The system of claim 9, wherein:
the hierarchy comprises a first tier and a second tier,
the first tier forms blocks that are connected by the second type of network topology, and the blocks are further connected by forwarding devices in the second tier which are linked to the blocks according to the first type of network topology.

13. The system of claim 9, wherein the forwarding devices are arranged in a hierarchy such that the links are between forwarding devices located at different levels of the hierarchy.

14. The system of claim 13, wherein:
the hierarchy comprises a first tier and a second tier,
the first tier forms the blocks and the blocks are connected by the second type of network topology,
the blocks are further connected by forwarding devices in the second tier which are linked to the blocks according to the first type of network topology, and
the list of links includes only links connecting the blocks according to the first type of network topology.

15. A system for use in a network described by a plurality of different types of network topologies, the plurality of different types of network topologies comprising a first type of network topology and a second type of network topology, the plurality of different types of network topologies defining a plurality of network blocks and the second type of network topology defining at least one connection between the plurality of network blocks not conforming with the first type of network topology, the system comprising:
a non-transitory computer readable memory storing executable instructions; and
a processor configured to access memory storing a list of the network blocks, and a list of links connecting the network blocks, wherein the executable instructions, when executed by the processor, cause the processor to:
identify a plurality of paths in the network from a source node in a first network block to a destination node in a second network block using one or more of the links in the list of links connecting the network blocks;
create a set of traffic rules for scheduling traffic over the plurality of paths, wherein the links used to schedule the network traffic include links connected according to the second type of network topology; and
configure a forwarding device in the network to forward packets using the set of traffic rules.

16. The system of claim 15, wherein the first type of network topology is a Clos type of topology.

17. The system of claim 15, wherein the second type of network topology is a cross-interconnect topology.

18. The system of claim 15, wherein the network comprises a plurality of links between forwarding devices, and the forwarding devices are arranged in a hierarchy such that the links are between forwarding devices located at different levels of the hierarchy.

19. The system of claim 18, wherein the forwarding devices are switches.

20. The system of claim 18, wherein:
the hierarchy comprises a first tier and a second tier,
the first tier forms blocks that are connected by the second type of network topology, and
the blocks are further connected by forwarding devices in the second tier which are linked to the blocks according to the first type of network topology.

21. The system of claim 15, wherein the forwarding devices are arranged in a hierarchy such that the links are between forwarding devices located at different levels of the hierarchy.

22. The system of claim 21, wherein:
the hierarchy comprises a first tier and a second tier,
the first tier forms the blocks and the blocks are connected by the second type of network topology,
the blocks are further connected by forwarding devices in the second tier which are linked to the blocks according to the first type of network topology, and
the list of links includes only links connecting the blocks according to the second type of network topology.

23. The method of claim 1, wherein configuring the plurality of forwarding devices to forward packets using the set of traffic rules comprises sending at least one traffic rule in the set of traffic rules to at least one forwarding device in the plurality of forwarding devices.

* * * * *